Dec. 19, 1950  H. L. BOWDITCH  2,534,569
RECORDING INSTRUMENT MECHANISM
Filed Oct. 18, 1949  2 Sheets—Sheet 1
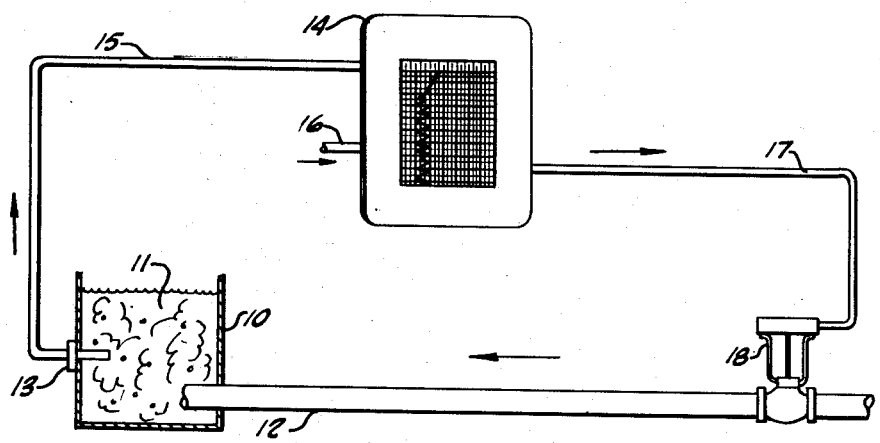
FIG. I
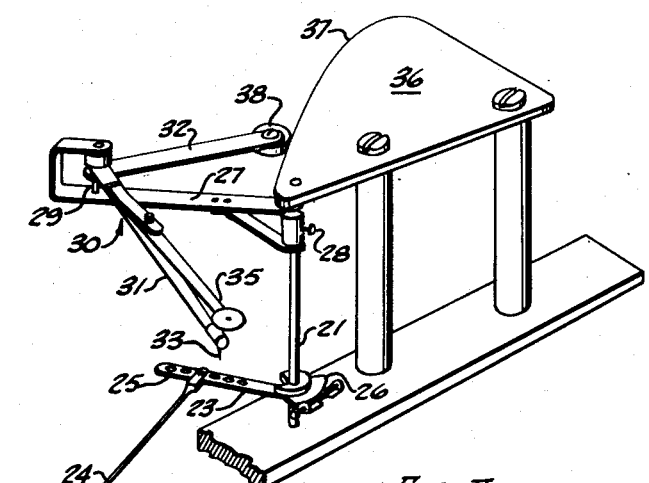
FIG. II
INVENTOR.
HOEL L. BOWDITCH
BY Curtis, Morris & Safford

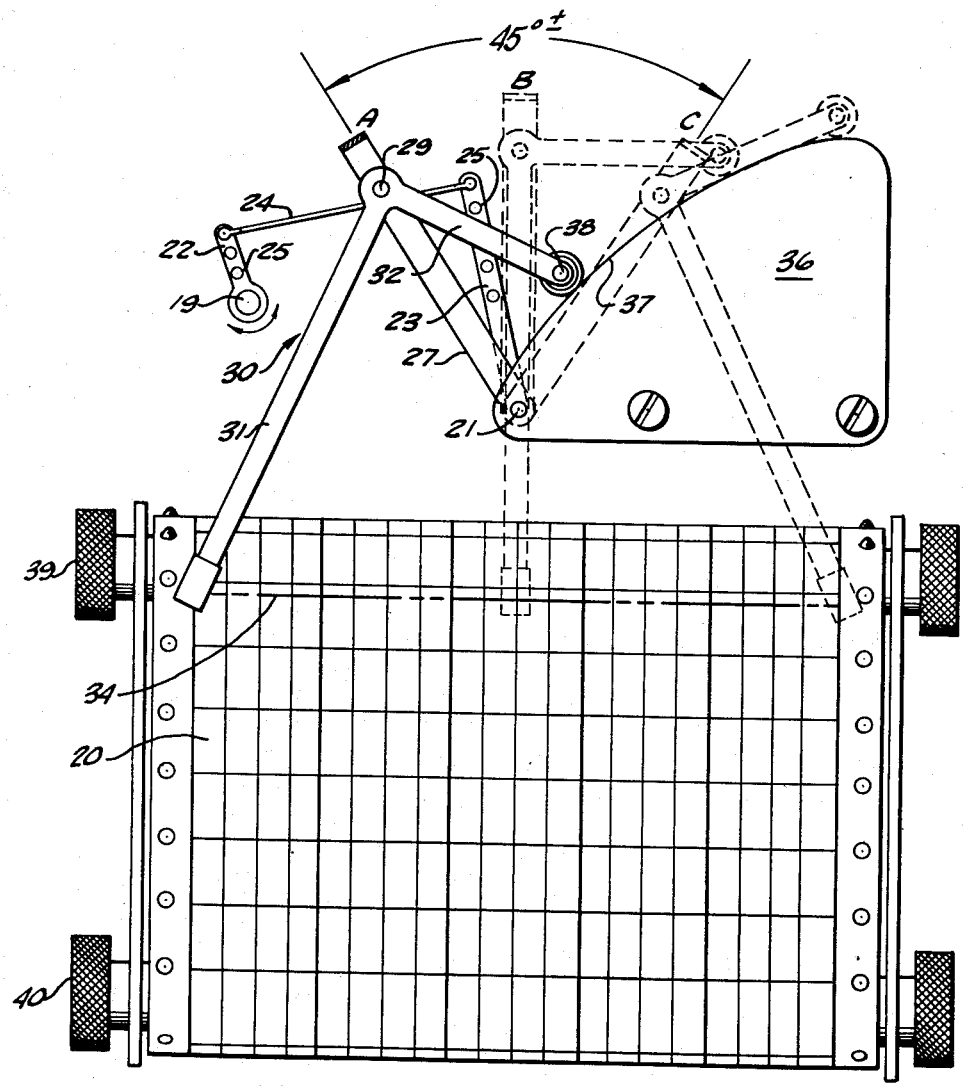
Fig. III
INVENTOR.
HOEL L. BOWDITCH

Patented Dec. 19, 1950

2,534,569

UNITED STATES PATENT OFFICE 2,534,569

RECORDING INSTRUMENT MECHANISM

Hoel L. Bowditch, Foxboro, Mass., assignor to The Foxboro Company, Foxboro, Mass.

Application October 18, 1949, Serial No. 122,021

1 Claim. (Cl. 346—112)

This invention relates to instruments of the type used for recording, indicating and/or controlling values of variable conditions such as temperature, pressure, flow and the like.

As a matter of standard practice, recording, indicating or control instruments all use some sort of condition sensing device. For example, devices for sensing values of temperature, pressure or flow may be used. The reactions of the sensing device to variations in the value of the variable condition, e. g., temperature, are transmitted by liquid or gas pressure or an electric current to the instrument proper, wherein they are normally converted into rotary movement of a mechanical member. This rotary movement is "linear" with respect to variations in the value of the variable condition. (The term "linear" is used here and elsewhere in the present specification in its mathematical rather than its physical sense to denote that the extent of angular movement of the rotatable mechanical member is linearly proportional to changes in the value of the measured condition.)

In instruments of the type referred to, it is sometimes desirable to record the value of the variable condition on a so-called strip chart, i. e., a paper recording surface that travels in a straight-line path past a recording element which may be for example, a pen. The recording element normally moves transversely with respect to the path of movement of the chart to record the values of the condition. In such cases, it is desirable that the recording element have a straight-line motion corresponding to the rotary movement of the above-mentioned mechanical member, which in turn, moves in response to variations in the measured condition. Moreover, the movement of the record element should be "linear" with respect to the rotary movement of the mechanical member.

Various mechanisms have been used with strip chart instruments. One of these produces a swinging, arcuate recording movement directly from the rotary movement mentioned above. This is unsatisfactory because it produces a curved record line which is difficult to interpret because of its departure from straight-line coordinates. In another structure, the rotary movement causes a carriage to be moved across the instrument in a straight-line movement. This structure is undesirable because it is cumbersome and expensive.

Accordingly, it is an object of the present invention to provide, in instruments of the type referred to, new and improved mechanism for converting rotary movement of a condition-responsive mechanical member into a corresponding straight-line movement of a recording element. It is another object of the invention to provide mechanism of this character which produces not only straight-line movement of the recording element but also causes the recording element movement to be maintained in substantially "linear" relation with respect to the rotary movement of the condition-responsive member. Other objects of the invention will be in part obvious and in part pointed out hereafter.

As an illustrative embodiment of this invention, mechanism is shown in the accompanying drawings and described herein in association with a strip chart type of recording instrument. With this mechanism, the rotary actuating movement which is mentioned above may be readily, simply, and inexpensively converted to straight line recording movement which is "linear" with respect to the rotary movement.

In the drawings:

Figure I is a schematic illustration of an application of a strip chart instrument to a process requiring temperature control;

Figure II is an illustration in perspective of a mechanism embodying this invention and operable as a part of a strip chart recorder, such as that shown in Figure I; and Figure III is a schematic illustration of the structure of Figure II, in association with a strip chart.

Referring to the temperature control process arrangement shown as Figure I, at the lower left thereof, there is a tank 10 containing a liquid 11 which is to be maintained at a desired temperature. The right wall of the tank is penetrated by a steam inlet pipe 12 through which steam is passed into the liquid 11 in a controlled manner depending upon the entire arrangement, as will be seen, to maintain the liquid at a desired temperature. The left wall of the tank 10 has, extending therethrough and into the liquid a thermometer 13 of the type which produces vapor pressure variations in accordance with temperature variations, and there is a connection between the thermometer and the centrally located strip chart recording instrument 14, in the form of a small tube 15 through which the vapor pressure variations from the thermometer 13 are transmitted. Leading into the left side of the instrument, below the small tube 15, is an inlet 16 for supplying the air under pressure necessary to operate the instrument 14. Leading out of the right side of the instrument is an output pipe 17 through which pneumatic control pressures from the instrument are transmitted.

The pipe 17 is connected, at the right of the instrument, to an air operated valve 18 in the steam pipe 12. Thus the instrument controls the steam valve 18 in accordance with the temperature of the liquid 11.

In this instrument, as in those previously generally mentioned herein, vapor pressure variations from the thermometer result in rotary movement within the instrument, which in this instance is the movement of a rotary shaft as indicated in Figure II at the bottom left by the number 19 and in Figure III at the top left by the same number. Associated with the showings of the rotary shaft 19 are double arrows indicating that the shaft may rotate in either direction, depending upon whether the vapor pressure variations from the thermometer 13 indicates a rise or fall in the temperature of the liquid 11.

Referring now to Figures II and III, the mechanism operable by the rotation of the shaft 19 is shown by itself in Figure II, and in a more schematic manner, in the upper portion of Figure III, the lower portion of Figure III being a showing of a strip chart 20 in association with the mechanism. Thus the mechanism is located above the strip chart and in laterally central location with respect thereto.

It will become apparent from the following description that essentially, the action of this mechanism is to swing a recording arm about a pivot, the normal result of which would be to swing the recording end of the arm in an arc, and to simultaneously move the pivot bodily in an arc in opposition to the "normal" arc to produce a resultant straight-line recording movement.

The present mechanism is actuated by rotary movement of the shaft 19 corresponding to temperature variation in the liquid 11. This rotary movement is transmitted to another shaft, centrally located, Figure III, at the bottom of the mechanism, as indicated by the number 21. These shafts are parallel, and are connected to each other through the arms 22 and 23 which are fixed respectively to the shafts 19 and 21, and a link 24 which connects the arms 22 and 23. These arms are each provided with a series of connection openings 25, in order that the rotational relation between the shafts 19 and 21 may be varied by connecting the link 24 at different openings in the arms, to vary the operating lengths thereof and consequently the leverage. Connecting link 24 to different openings in arms 22 and 23 changes the amount that one shaft rotates for a given movement of the other shaft, but does not change the "linear" relation between their movements, and consequently the rotation of the shaft 21 is also "linear" with respect to the thermometer variations.

A further adjustment is provided, see Figure II, between the arm 23 and the rotatable shaft 21 to which it is secured, in the form of a screw and gear sector unit on the shaft 21 at the point of connection of the arm 23 thereto, as indicated at 26. This unit may be used to adjust the arm 23 about the shaft 21 as a center to vary the rotary position of the shaft 21 with respect to that of the shaft 19, or to adapt the arms 22 and 23 to a longer or shorter link without changing the relative rotary positions of the shafts 19 and 21.

On the forward part of the shaft 21, the pivoted arm 27 is mounted for movement therewith, being fixed thereto by a set screw 28. Referring to Figure III, this arm 27 extends upwardly away from the strip chart 20, and its movement, as controlled by the rotation of the actuating shaft 19, is arcuate and of the order of 45 degrees, that is, about twenty-two and one-half degrees on either side of a vertical center line extending transversely through the pivot shaft 21. The arm 27 is shown, in Figure III, in full lines at its laterally extreme left position A, and in dotted lines at its central vertical position B, and at its laterally extreme right position C. As best seen in Figure II, the outer end of the arm 27 is bent back on itself in U formation, with a pivot shaft 29 extending between the legs of the U as the pivot support of the bell crank lever 30, as well as its connection to the arm 27. Thus the bell crank pivot shaft 29 is located at a substantially distance from the pivot 21 of the arm 27.

The bell crank lever 30 is formed with a long, recording leg 31 extending from the bell crank lever pivot connection 29, down over the chart 20, and a short, cam leg 32 extending generally to the right from the pivot 29, with these legs at right angles to each other. The pivot 29 is parallel to the previously mentioned rotary shafts 19 and 21, and perpendicular to the recording face of the strip chart 20, so that the arm 27 and the bell crank lever 30 swing in parallel planes, which are also parallel to the recording face of the chart. The free end of the recording leg 31 of the bell crank lever swings over the upper portion of the chart and, Figure II, a pen is mounted thereon at 33, for recording, on the chart, the movements of the leg 31 across the chart.

In Figure III, the straight line movement of the end of the recording leg 31 is illustrated by showing the chart as being stationary, and the three positions A, B, and C of the arm 27 locate the free end of the recording leg 31 in three positions across the chart, with the line between the three positions on the chart indicated at 34 as representing the straight line movement. As shown on the chart in Figure I, the record line is a combination of the transverse movement of the pen 33 and the downward movement of the strip chart 20. Secured to the recording leg of the bell crank lever as a visual indication of the lateral position of the pen 33 on the chart, is a target member shown in Figure II only, at 35.

At the right of the mechanism, Figure III, as a means of aiding in rotating the bell crank lever 30 on its pivot 29, the cam plate 36 is provided, the upper edge thereof being formed as a cam track 37. This cam plate is mounted above the strip chart and parallel with the recording face thereof, and, as a convenience in this instance, the lower left portion of the cam plate provides one of the bearings for the pivot shaft 21. The free end of the bell crank lever cam leg 32 is provided with a cam contact roller 38 for engaging the cam track 37. This roller is heavy enough to offset the weight of the bell crank recording leg 31 and keep the roller in contact with the cam edge 37.

The curve of the cam track depends on the dimensions chosen for the various parts of the mechanism. Not only must the record line be straight, but the movement of the pen 33 therealong must be "linear" with respect to signals from the thermometer. Proper formation of the cam track contour balances the straight-line factor against the "linearity" factor to produce a combination of both in the movement of the pen. The construction and arrangement of the strip chart 20 and its associated mechanism is standard practice. There are upper and lower rollers, 39 and 40, with the chart being drawn from one to the other, usually downward, so that the record remains visible for some time after it has been made, before it is hidden by being rolled up on the lower roller. Such a record may be seen in Figure I.

As the arm 27 is moved about its pivot 21 by a change in thermometer signal, the bell crank lever 30 is moved bodily therewith, tending to move the free end of the bell crank recording leg 31 in an upward arc. However, at the same time, the movement of the bell crank lever cam leg 32 along the cam track 37 causes the bell crank lever to move about its pivot 29, introducing a tendency to move the free end of the leg 31 in a downward arc. The resultant of these two tendencies is straight-line movement of the pen 33 across the chart 19, as indicated by the line 34.

The choice of dimensions for the various parts of the mechanism, for example, the length of the arm 27, and the lengths of the legs of the bell crank lever, are chosen with an eye to the desired relative locations of the mechanism and the strip chart, and the amount of motion desired. Any combination of lengths and positions of levers and arms such as shown and described herein, which balances one arcuate movement against another to provide a straight line movement, is believed to be within the scope of this invention.

The mechanism of this invention is not only simple, inexpensive, and productive of a straight line movement, but it also has the further considerable advantage that, because of these factors, it can be used to readily and simply adapt the actuating mechanism which produces rotary movement in standard rotary operating instruments, to instruments requiring a straight line recording movement, such as strip chart instruments.

I claim:

A mechanism for converting angular movement to straight line movement for instruments of the type used for recording, indicating, or controlling values of variable conditions such as flows, pressures, temperatures and the like, in which equal angular movements produce equal straight line movements, said mechanism comprising the novel combination of a pivoted arm, movable about its pivot through an arc of the order of 45 degrees, a bell crank lever pivoted on said arm for bodily movement therewith, a cam mounted for operative relation with one leg of said bell crank lever, and a pen mounted on the other leg of said bell crank lever, whereby as said arm is moved about its pivot, said bell crank lever is pivoted with respect to said arm as a result of the cam leg of said bell crank lever following said cam, and the pen on the other leg of said lever describes said straight line.

HOEL L. BOWDITCH.

REFERENCES CITED

The following references are of record in the file of this patent:

UNITED STATES PATENTS

| Number | Name | Date |
|---|---|---|
| 2,442,586 | Clark | June 1, 1948 |